United States Patent Office 3,494,983
Patented Feb. 10, 1970

3,494,983
VULCANIZABLE POLYDIENE CONTAINING
INTERPOLYMERS
Hugh E. Diem, Wadsworth, Ohio, assignor to Goodrich-Gulf Chemicals, Inc., Cleveland, Ohio, a corporation of Delaware
No Drawing. Continuation-in-part of application Ser. No. 510,067, Nov. 26, 1965. This application Feb. 19, 1969, Ser. No. 800,694
Int. Cl. C08f 15/40, 1/32, 1/42
U.S. Cl. 260—878         12 Claims

ABSTRACT OF THE DISCLOSURE

A substantially gel-free, hydrocarbon soluble, sulfur vulcanizable, elastomeric interpolymer is provided comprising a diolefin polymer interpolymerized with at least two olefins in the presence of a catalyst system comprising an organometallic compound in combination with a heavy metal compound.

---

This application is a continuation-in-part of copending application Ser. No. 510,067, filed Nov. 26, 1965, now abandoned.

BACKGROUND OF THE INVENTION

Field of the invention

This invention relates to the manufacture of sulfur vulcanizable and vulcanized elastomeric interpolymers. More particularly, however, this invention is concerned with interpolymers produced from various olefin compounds in combination with certain polydiene compounds, the latter compounds being of a type which confer sulfur cure capabilities on such interpolymers.

Description of the prior art

In addition to being formed from monomers which are widely available in commercial quantities and at attractive prices, ethylene-propylene type copolymers contain little, if any, residual unsaturation and consequently do not suffer from the attack of ozone and oxygen, agents having a detrimental effect on ordinary elastomers. Besides being relatively inexpensive and inert, ethylene-propylene elastomers can have, depending on the ratio of the component monomers, extremely good low temperature and other physical properties. For the foregoing and additional reasons therefore, ethylene-propylene type elastomers are materials of considerable commercial worth which it is desirable to employ in various applications now using other more expensive materials.

In order for these elastomers to realize wide-spread use, however, it is necessary that they be capable of undergoing a cross-linking "cure" vulcanization type reaction. Cured elastomers possess superior physical characteristics; they have, for example, better abrasion resistance, are considerably stronger than uncured materials, are more elastic, and in addition, the cured elastomers have a greatly reduced tendency to soften when exposed to elevated temperatures.

Heretofore, one of the principal disadvantages of the ethylene-propylene type elastomers has been the difficulty encountered in obtaining efficient cures, compatible with industrial practices, which result in acceptable commercial products. One method which has been proposed employs peroxide-type free radical generators to produce a cure. Although the employment of peroxide materials produces a cured ethylene-propylene elastomer, the use of such a system is undesirable for various reasons. Peroxide cures are, for instance, relatively expensive and in many cases difficult to accomplish. Furthermore, the use of curing techniques which include peroxides, frequently results in an elastomeric product having objectionable residual odors.

Most industrial organizations employing elastomers in fabrication of finished and semi-finished goods, the principal potential users of the ethylene-propylene containing elastomeric interpolymers contemplated herein, possess a considerable amount of experience and know-how with respect to sulfur-type cures. In addition, much of the equipment and technology which has been developed in the elastomeric field relates to the sulfur vulcanization process. It can readily be appreciated, therefore, that an ethylene-propylene type elastomer which lends itself to curing with standard sulfur techniques is much to be preferred over other systems presently known.

In order to introduce unsaturation which can provide sulfur vulcanizable sites in otherwise sulfur unreactive ethylene-propylene polymers, it has been previously proposed to terpolymerize ethylene and propylene with certain polyolefin compounds. Such a technique has been employed to synthesize vulcanizable ethylene-propylene interpolymers having considerable commercial value. Compared to the unsaturation present in natural rubber and styrene-butadiene copolymers, the unsaturation thus produced in ethylene-propylene elastomers is relatively small. In those cases, therefore, in which it becomes desirable to employ mixtures of ethylene-propylene type elastomers with natural or SBR type rubbers, the curing agent employed, for example sulfur, has a greater statistical opportunity to encounter points of unsaturation in the natural and SBR rubbers, with the result that the ethylene-propylene type interpolymer may sometimes be insufficiently vulcanized. Since the combining of ethylene-propylene type elastomers with natural and/or SBR type rubbers is frequently of advantage, development of an ethylene-propylene interpolymer possessing cure compatibility with natural, SBR and other more unsaturated rubbers is desirable.

Now a method has been found for producing olefin containing, particularly ethylene-propylene containing, interpolymers which can readily be cured by conventional sulfur processes. The ethylene-propylene elastomers capable of such curing methods are made possible by chemical incorporation within such elastomers of certain polydienes which can readily be obtained at commercially advantageous prices. The ethylene-propylene containing elastomeric interpolymers discovered can be cured with conventional sulfur type vulcanization procedures and no unusual or specialized equipment is required. Furthermore, the resulting products have improved physical characteristics and are noticeably less subject to degradative effects produced from contact with various oxygen-containing substances than certain other elastomers. Although when vulcanized conventionally with sulfur or sulfur-containing compounds, the ethylene-propylene containing elastomeric interpolymers of the invention possess increased abrasion resistance, the elastomers do not have objectionable residual odors often encountered with the peroxide-type cures. Inasmuch as the polydienes employed contain relatively large amounts of unsaturation, ethylene-propylene interpolymers containing them may be successfully vulcanized in the presence of other rubbers as, for example, with natural and SBR rubbers. Because of their molecular configuration, the interpolymers discovered possess an inherent self-lubricating quality, which results in easy processability.

SUMMARY OF THE INVENTION

In accordance with the present invention, a substantially gel-free, hydrocarbon soluble, sulfur vulcanizable, elastomeric interpolymer is provided comprising a polymer of a conjugated diolefin containing from about 4 to about 8 carbon atoms, exhibiting a molecular weight less than about 5,000 and containing from 2 to about 8 vinyl groups per polymer molecule, interpolymerized with at least two mono-olefins containing from 2 to about 8 carbon atoms in the presence of a catalyst system comprising an organometallic compound of a metal situated in Groups II–A through IV–A of the Periodic Table in combination with a compound of a heavy metal situated in Groups IV–B, V–B, VI–B and VIII of the Periodic Table, said diolefin polymer comprising from about 0.1 to about 1.5 mole percent of the interpolymer.

DESCRIPTION OF THE INVENTION

Substantially gel-free, hydrocarbon soluble, sulfur vulcanizable, elastomeric interpolymers can be produced in accordance with this invention by a process which comprehends the formation from conjugated diolefin monomers which include 1,3-butadiene, isoprene (2-methylbutadiene-1,3), piperylene (pentadiene-1,3), hexadiene-1,3 and other conjugated diolefin containing from about 4 to about 8 carbon atoms, of relatively low molecular weight diolefin polymers having a polymerizable vinyl structure, and interpolymerizing such diolefin polymers with the desired amounts of mono-olefins, particularly ethylene and propylene, to form an interpolymer having a sufficient number of polymerizable vinyl groups to enable a satisfactory sulfur cure to be obtained.

The interpolymers, more particularly terpolymers, of the invention comprise in the preferred embodiment an ethylene-propylene polymer backbone to which are attached, at periodic intervals, unsaturated side chains of a diolefin polymer. The unsaturated side chains can undergo reaction with curing agents such as, for example, sulfur to produce the desired vulcanized elastomer.

In synthesizing diolefin polymers capable of undergoing polymerization with mono-olefinic monomers, for instance ethylene and propylene, it is necessary to carry on the polymerization in such a manner as to produce in the molecules a polymerizable amount of 1,2 unsaturated vinyl structure, namely, from about 2 to about 8 vinyls per diolefin polymer molecule. Following synthesis, which can be carried on with any of several catalyst systems, the diolefin polymer can be separated from the reaction mixture in which it has been formed, or the system can be suitably altered by addition of other substances, including appropriate catalysts, and interpolymerization of the diolefin polymer with ethylene and propylene initiated. Irrespective of whether or not the diolefin polymer is isolated, the ethylene-propylene interpolymerization with said diolefin polymer is preferably carried out in a solvent medium, advantageously in the presence of organometallic-heavy metal catalysts, to produce the sulfur vulcanizable interpolymers of the invention. Following interpolymerization in the above manner, the reaction mixture is inactivated and the polymeric product worked up to obtain the interpolymer sought.

Interpolymers of the foregoing type, when combined with vulcanizing agents, such as sulfur or sulfur-containing compounds, ordinarily in association with certain auxiliary substances, can readily be vulcanized to form elastomeric products displaying the physical properties necessary to permit their use in a wide variety of products such as, for instance, tire, mechanical goods and in similar applications.

Although various mono-olefins and mixtures of olefins can be used in preparing the interpolymers, mono-olefins which have been found to be especially useful in the preparation of the sulfur vulcanizable elastomers of the invention are those containing from 2 to 8 carbon atoms, including ethylene, propylene, butylene, 3 methyl butene-1, 4 methyl pentene-1 and combinations thereof. Interpolymers including both ethylene and propylene monomeric units have been found to be of particular advantage, however, not only because of the desirable properties exhibited by interpolymers containing such components, but in addition, because of the efficiency with which such material can be vulcanized.

It will be appreciated that conjugated diolefins such as 1,3-butadiene, isoprene and the like, can polymerize in any of several different molecular configurations. To illustrate, 1,4 addition polymerization can take place to give 1,4-units which may be either of the cis

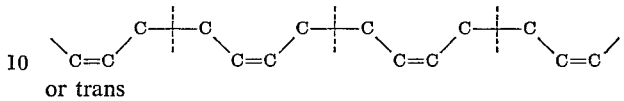

or trans

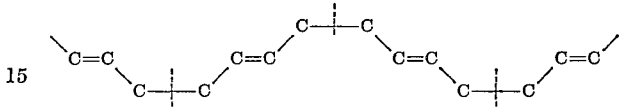

configuration about the double bond. Monomeric units in the structures shown are set off by vertical dotted lines. Partly, however, the addition can occur 1,2 at a double bond to produce 1,2 or "unsaturated vinyl" units.

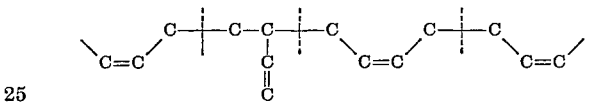

In producing interpolymers of the type disclosed herein, the unsaturated vinyl groups contained by the diolefin polymers are primarily responsible for supplying the reactivity necessary for the diolefin polymers to subsequently undergo addition type polymerizations with olefins such as ethylene and propylene. Unsaturation resulting from the 1,4 structure in the diolefin polymers, on the other hand, may remain relatively uneffected during interpolymerization with the olefins. Unsaturation present in the attached diolefin polymer (side) chains, whether 1,4 cis; 1,4 trans, or 1,2 appears to be available for, and capable of reaction with the curing agents preferably employed to produce the desired vulcanization.

Although one unsaturated vinyl group per diolefin polymer molecule would theoretically be a sufficient reactive site to effect a vulcanizable combination of said diolefin polymer with the ethylene-propylene, whether as a side chain or otherwise, it has been found that provision of somewhat more than one such structure in each such polymer molecule is desirable. The presence of at least about two unsaturated vinyl groups per diolefin polymer molecule, for example, assures a relatively rapid and efficient reaction with the ethylene and propylene in the subsequent interpolymerization reaction, and is preferred in practicing the invention.

While a minimum number of unsaturated vinyl groups is necessary to induce successful interpolymerization, one can include as many additional such groups as is necessary to produce the interpolymer sought although, it is preferable that the number of such groups in the diolefin polymer be controlled, depending on the properties of the polymer desired. Expressed in another way, when the number of monomeric units polymerized 1,2 in a given diolefin polymer becomes excessive, difficulty may be experienced in reacting said diolefin polymer with ethylene and propylene to produce the desired interpolymer. In addition, when the number of vinyl groups per diolefin polymer molecule becomes excessive, the resulting interpolymer is highly cross-linked and insoluble in hydrocarbon solvents. Unless a portion of the vinyl unsaturation is to be suitable modified by hydrogenation or otherwise, therefore, it is preferable to avoid use of diolefin polymers containing more than about eight vinyl groups per polymer molecule. Inclusion of less than such amounts obviates any difficulties in this regard.

While homopolymers of conjugated diolefins containing from about 4 to about 8 carbon atoms such as butadiene-1,3, isoprene and piperylene are particularly preferred, interpolymers of 1,3-butadiene or isoprene with each other or with one or more other monomers such as, for example, styrene, and the like, can also be employed, to form the sulfur vulcanizable interpolymers of the invention.

Diolefin polymers of the type described herein, adapted for preparation of sulfur vulcanizable interpolymers, can be prepared through use of any suitable polymerization system of the types known in the art. Among the more widely known processes, may be mentioned polymerization in the presence of an alkyllithium catalyst. Although other methods may be employed, such catalyst can be generated by reacting lithium metal with an alkyl halide to produce a lithium halide together with the desired alkyllithium component. Advantageously, the reaction can be carried out in the solvent in which it is intended to carry on the diolefin polymerization, i.e., any inert hydrocarbon solvent medium for example, hexane, pentane, cyclohexane, benzene and the like, and their mixtures. Following removal of the lithium halide, the diolefin can be introduced into the alkyllithium containing solvent, and the polymerization initiated permitted to continue until any desired molecular weight is obtained. The catalyst system can then be inactivated by addition of a substance containing active hydrogen ions, for instance alcohol, and the polymerization product subsequently separated from solution. If desired, small amounts of ether can be included in the system to alter the amount of 1,2 structure formed normally in the absence of ether constituting from about 8 to 15 mole percent. Since the number of diolefin polymer molecules formed is directly proportional to the moles of catalyst present, molecular weight control can be exercised by adjusting the ratio of moles of alkyllithium to moles of diolefin monomer. Employing an alkyllithium catalyst enables the obtainment of diolefin polymers ranging in molecular weight from relatively low molecular weight oligomers to polymers exhibiting molecular weights up to about 5000. Characteristically, however, these lithium catalyzed polymers, regardless of molecular weight, will contain from about 8 to 15 percent 1,2 structure. Therefore, varying the molecular weight produces a convenient means of varying the number of vinyl groups per diolefin polymer molecule.

Equally suitable for the purpose, however, are systems which employ heavy metal compounds such as, for instance, cobalt dioctoate in combination with organometallic compounds, including the iodides, particularly diethyl aluminum iodide. The polymerization is commonly carried on in a solvent medium, as benzene, toluene, xylene or various other aliphatics including combinations of them, and can be modified with a material such as water. The reaction can readily be accomplished when for every mole of diolefin monomer present in the system, there is present from about 0.5 to 9.0 millimoles of an organoaluminum compound, and for every 500 moles of monomer to be polymerized from about 0.6 millimole to about 157 millimoles of the heavy metal compound. The modifier, when present, is normally adjusted to comprise from about 0.04 to about 0.8 millimole per millimole of organoaluminum used. The reaction which is advantageously carried on in sufficient solvent medium to provide easily manipulated reaction mixture viscosities, and at moderate temperatures, 70° C. and below, is capable of producing molecular weight diolefin polymers containing from about 20 to about 35% of the 1,2 structure.

Various other systems can also be employed, however, to form satisfactory diolefin polymers.

As previously indicated, it is necessary to provide a certain degree of vinyl unsaturation in order that the diolefin polymer can easily undergo interpolymerization with monomers such as ethylene and propylene. It will be appreciated that such requirement has the effect of determining the minimum molecular weight of the diolefin polymer employed for preparation of the interpolymers of the invention, the determinative factor being, of course, the number of vinyl groups per diolefin polymer molecule in the particular diolefin polymer chosen. Aside from such requirement, a practitioner of the invention can exercise considerable latitude in selecting the molecular weight of the diolefin polymer. Generally speaking, the longer the polymer molecules become, the greater their effect on the physical properties of the interpolymer. The precise chain molecular weight chosen in a particular situation, therefore, will depend on the properties which it is desired to achieve in the interpolymeric product.

The diolefin polymers useful in the present invention are those of relatively low molecular weight, generally below about 5000. Relatively speaking, the high molecular weight of the diolefin polymer compared to the molecular weight of the olefin comonomers can result in high weight concentrations of the diolefin polymer in the interpolymer even at low molar percentages. It has been found in this invention that a sulfur vulcanizable interpolymer can be obtained when small mole percentages, i.e., from about 0.1 to about 1.5 mole percent of the diolefin polymer, are present. Economic considerations, however, dictate that the relatively more expensive diolefin polymer be present in as low weight percentage as is feasible. Hence, the lower molecular weight diolefin polymers, viz. about 1000 or less, are most preferred and enable a commercially attractive interpolymer to be obtained. It is considered important, however, that the relationship between molecular weight and vinyl content of the diolefin polymer be commensurate, such that the number of vinyls per molecule varies from 2 to about 8.

The number of vinyls per molecule are in direct proportion to the vinyl content and the degree of polymerization. The degree of polymerization is the quotient of the molecular weight of the polymer divided by the molecular weight of the monomer. In other words, the number of vinyls per molecule can be obtained by the following relationship:

$$\text{vinyls/molecule} = \frac{\text{percent vinyl}}{100} \times \frac{(M.W.)_p}{(M.W.)_m}$$

wherein $(M.W.)_p$ is the molecular weight of the polymer and $(M.W.)_m$ is the molecular weight of the monomer.

Below about 2 vinyls per molecule, the diolefin polymer exhibits insufficient polymerization activity and little diolefin polymer is found to enter the interpolymer. Above about 8 vinyls per molecule, the diolefin polymer imparts a highly cross-linked structure to the interpolymer resulting in high gel formation and insolubility of the resulting interpolymer. In addition, above about 8 vinyls per molecule, difficulty may be experienced in reacting said diolefin polymer with the olefin comonomers to produce the desired interpolymer.

It has been found in accordance with the present invention that the obtainment of substantially gel-free, i.e., less than about 5% gel, hydrocarbon soluble polymer is dependent upon the conjoint use of a diolefin polymer having a molecular weight less than 5000 and a vinyl content below about 40% such that the number of vinyl groups per molecule or polymer chain range from 2 to about 8. For example, a polybutadiene with a relatively low molecular weight of 1000 and a relatively high vinyl content of 40 percent would contain about 7.4 vinyls per molecule; whereas, a polybutadiene with a relatively high molecular weight of 5000 and a relatively low vinyl content of 8 percent would similarly contain about 7.4 vinyls per molecule. Each of such polybutadienes when interpolymerized in accordance with the present invention would result in a hydrocarbon soluble, substantially gel-free, sulfur vulcanizable interpolymer.

Inclusion of even minimal amounts of such diolefin polymers in an ethylene-propylene containing interpolymer will provide points at which the vulcanization agents can react, although, in order for superior vulcanized products to be obtained, it is necessary that the diolefin polymer be included in the ethylene-propylene portion of the interpolymer in certain preferential amounts. Considering each of the ethylene, propylene, and diolefin polymer components of the interpolymer as independent molecules for the purpose of defining their desirable relative amounts in the interpolymer, it has been found that, while lower values may in many cases be resorted to, the incorporation of at least about 0.1, more preferably from about 0.4 to about 1.5 mole percent of diolefin polymer with the ethylene and propylene components, based on the total moles of components present, produces a vulcanizable interpolymer exhibiting properties necessary for elastomers which are to experience appreciable commercial use. If desired, of course, additional amounts of polymer can be introduced into the interpolymer.

Following preparation of the diolefin polymer, either as previously described or otherwise, said polymer can be separated from extraneous reaction matter and introduced into the interpolymerization reaction. In many instances, however, the polymerization reaction mixture used in synthesizing the diolefin polymer is compatible and can be advantageously used in conjunction with the system to be employed in accomplishing the interpolymerization. Such a procedure is possible, for example, when the diolefin polymer is formed in the presence of the organometallic-heavy metal polymerization system described (supra). In such a case, the interpolymerization catalyst components are added to the diolefin polymer reaction system, additional solvent is added, as may be required, and ethylene and propylene are fed into the system to initiate interpolymerization. Alternatively, following its production as an isolated component, the diolefin polymer is combined with ethylene and propylene in a suitable interpolymerization reaction to produce the desired interpolymer.

While sufficient amounts of diolefin polymer should be present to assure an interpolymer having satisfactory vulcanization properties, the practitioner can choose any ratio of olefin unit components desired. Thus, in the case of interpolymers containing ethylene and propylene in combination with polydiene units, a product can be formed which contains—except for the polydiene component—practically all ethylene. On the other hand, if preferred, an interpolymer can be obtained in which the olefin content consists almost entirely of propylene. An interpolymeric product wherein ethylene and propylene units are present in approximately equi-mole concentration displays particularly valuable properties, however, and interpolymers having such olefin distribution are particularly valued.

Although other catalysts have been found which can successfully be employed to interpolymerize olefins with the polydienes described herein, the use of catalysts comprising organometallic compounds of the metals in Groups II–A through IV–A of the Periodic Table of the elements as shown in the Handbook of Chemistry and Physics, 47th ed., the Chemicals Rubber Co., Cleveland, Ohio (1966), particularly organoaluminum compounds or organomagnesium compounds, in combination with compounds of heavy metals in Groups IV–B through VII–B and VIII of the Periodic Table of the Elements, supra, is particularly desirable.

Organoaluminum compounds can conveniently consist of trialkylaluminum compounds such as, for example, trimethylaluminum, triethylaluminum, triisobutylaluminum and higher derivatives of aluminum. Other suitable organoaluminums include, for instance, alkylaluminum halide compounds in which the halide may be chloride, bromide, iodide or fluoride, and the alkyl substituent can comprise methyl, isobutyl, octyl and similar radicals. Among such compounds can be mentioned ethylaluminum dichloride, diethylaluminum bromide, diethylaluminum chloride, diisobutylaluminum chloride, diethylaluminum bromide, diethylaluminum fluoride and others. Additional catalyst components which may be employed are alkoxy, aryloxy, carboxy containing organoaluminums, such as diisobutyl isobutoxy aluminum, diethylphenoxy aluminum, diisobutylaluminum acetylacetonate and many others. Also operable are mixtures of dialkylaluminum monohalide and monoalkyl aluminum dihalide compounds, substances commonly referred to as aluminum sesquihalides.

Many different heavy metal compounds can be used including those containing, for example, titanium, vanadium, iron, cobalt, nickel and the like. Of particular value in polymerizing the monomers, however, are salts of vanadium in which the vanadium is present in the plus 3, 4 or 5 oxidation states, including the halides, oxides, salts of organic as well as inorganic acids and complexes containing vanadium compounds. Specifically, vanadium compounds such as vanadium trichloride, vanadium tetrachloride, vanadium triiodide, vanadium tetraiodide and various other halo-vanadium compounds; vanadium oxide, vanadium triacetylacetonate, vanadium oxytrichloride, vanadium hydroxide, vanadium sulfide, vanadium sulfate, vanadate esters of the type $VO(OR)_3$ in which R may be methyl, ethyl, isopropyl, butyl and the like, and additional vanadium containing materials are suitable.

The relative amounts of the catalyst components can be varied within broad limits. Usually, however, it is convenient to include a minimum amount of 1.0 gram millimole of the organometallic compound, such as an organoaluminum, for every 100 grams of interpolymer to be prepared, and the use from about 13 to 80 gram millimoles of organoaluminum catalyst component for every 100 grams of interpolymer is preferred.

With respect to the heavy metal compound, at least about 0.05 gram millimole of such compound, as for instance a vanadium compound, is required for each gram millimole of the organometallic catalyst component. The number of the moles of vanadium component should not be more than about double the moles of organoaluminum present, however, and in the preferred case, it has been determined that 1 gram millimole of the vanadium component should be used for approximately every 1 to 10 gram millimoles of organoaluminum catalyst component present. Although interpolymerization of the monomers can be carried out in its absence, the presence of an inert polymerization medium, advantageously one having an applicable component solubilizing ability which is liquid under the reaction conditions, provides certain advantages in carrying out the interpolymerization process, and its use is desirable. Operative polymerization media comprise various aromatics, i.e., benzene, toluene, xylene and the like; aliphatics including butane, 2-butane, pentane, hexane and heptane, as well as similar materials, including various chlorinated hydrocarbons such as tetrachloroethylene, chlorobenzene and the like. Mixtures of any of the preceding or other similar hydrocarbons can also be successfully employed. Although greater quantities may be used, the employment of a minimum of about 500 cc. of polymerization medium for each 100 grams of interpolymer to be prepared produces a superior system. In the preferred embodiment of the invention, however, at least about 1,000 cc. of polymerization medium for each 100 grams of interpolymer is employed.

The interpolymerization can be carried out in a variety of ways. Basically, the reaction is achieved by combining the polymerization medium, monomers and catalyst and carrying out the reaction thereby initiated to the point at which desired conversion to interpolymer has been obtained. The interpolymerization can be carried on in either a batch or continuous fashion as preferred.

When ethylene and propylene are interpolymerized with a suitable polydiene in a batch system, the production of a product having suitable properties can readily be obtained. The order of addition with respect to the components of the interpolymerization reaction is not particularly critical; however, it is preferable that all the monomers which it is proposed to interpolymerize be present before the complete catalyst system is added.

The relative amounts of olefins required to be charged to the reaction mixture in order to achieve a particular composition of olefin units in the interpolymer, will depend upon the respective reactivity of each of the olefins. In producing the ethylene-propylene containing interpolymers, particularly with the vanadium type catalyst, the ethylene reacts much more rapidly than the propylene, and it is necessary, for example, in order to obtain an interpolymer which includes ethylene and propylene in about equi-molar amounts to maintain the reaction mixture in a condition such that the respective olefin monomers are present in a ratio of approximately 80 moles of propylene for each 20 moles of ethylene.

The interpolymerization reaction, which is conducted in an inert atmosphere such as nitrogen, argon, hydrocarbon vapors or the like, can be carried out at any of various pressures including atmospheric, autogeneous or higher. It can also be carried out under subatmospheric conditions, the only requirement being that conditions of pressure and temperature be such that the system maintains its essentially liquid character. In the case of the ethylene-propylene containing interpolymers, although other pressures can be used, a working pressure of about 10 to 25 p.s.i.g. has been found to be convenient pressure at which to conduct the reaction.

As with the pressure variable, the temperature at which the interpolymerization is carried out can be varied through a wide range. Normally the interpolymerization is controlled at a temperature of from about room temperature, i.e., 22° C., to about 50° C. If preferred, however, the reaction can be conducted from about 0° C., or lower, to about 100° C.

Approximately 0.5 to 2 hours is ordinarily necessary to obtain a satisfactory interpolymerization, although, under suitable conditions, the reaction can be carried out in considerably less time.

After the interpolymerization has proceeded to the desired point, the reaction can be arrested by deactivating the catalyst in the reaction mixture. Deactivation can be accomplished by introducing into the mixture any of various substances which contain relatively active hydrogen ions such as, for example, alcohols. It is preferable, however, to use materials which have a similar effect insofar as deactivation is concerned but which contain relatively inactive hydrogen ions. Such materials include, for instance, any of various substances, such as, acetone, acetic anhydride, trialkyl amines and the like. Although the addition of an amount of catalyst deactivator such that approximately 1 mole of the latter agent is present for each mole of organometallic compound employed is theoretically all that is required for deactivation, in actual practice, it is preferable to add the deactivating agent in amounts constituting a level of about 5 or more moles of deactivator for each mole of the organometallic compound used.

Following deactivation of the reaction mixture, the interpolymer present can be separated from accompanying matter by precipitating it from solution, conveniently by addition to the reaction mixture of a substance which while substantially miscible with the mixture has little or no solvating capability with respect to the interpolymer. Alternatively, separation can be achieved by driving off the volatile constituents and leaving the interpolymeric product as a residuum. Following production of the interpolymer in a separable form, either through the addition of the reaction mixture to a substance having only a limited solubility for the interpolymer or by other means, the interpolymer can be treated by washing or otherwise to remove traces of the inactivated catalyst and then dried. Interpolymers of the type with which the invention is concerned are stable substances which are readily dried in a variety of equipment such as hot-air driers, extruder driers and various other similar devices.

It is frequently desirable to incorporate antioxidants or other compounding materials with the interpolymeric product. This can readily be accomplished by introducing such materials into the reaction mixture prior to separation of the polymer. Antioxidants of the type commonly used in natural or styrene-butadiene type rubbers are well suited to the protection of the interpolymer, and the addition of such materials in relatively minor amounts produces adequate stability.

In curing the interpolymers of the invention, peroxide cures of the type commonly used in conjunction with ethylene-propylene polymers can be employed. In addition, and preferably, sulfur curing techniques can be used.

In producing a sulfur cure, sulfur vulcanization agents such as sulfur or sulfur-containing compounds are normally combined with various auxiliary substances including accelerators, accelerator activators, softeners, filters, reinforcing agents and the like, and curing is carried out by a heating process in the manner well known in the art. Various procedures and modifications of sulfur curing are described in the Vanderbilt Rubber Handbook, S. S. Rogers, published by the R. T. Vanderbilt Company, New York, New York; Synthetic Rubber, G. S. Whitby, published by John Wiley & Sons, New York, New York, and others.

The following examples, although not intended to be limiting in nature, are illustrative of the invention:

*Example 1.*—In this example, polybutadiene capable of interpolymerizing with ethylene and propylene is prepared in the following manner. An apparatus is assembled consisting of a three-neck flask fitted with a Dry Ice condenser and equipped with a magnetic stirrer. To the flask, which is maintained under a nitrogen atmosphere, are added 300 milliliters of toluene and 35 milliliters (0.0119 gram mole) of butyllithium.

Following the above addition, the mixture is heated to 42° C., and 1,3-butadiene vapors are introduced below the surface of the liquid—the flow rate being adjusted so that about 103 grams of butadiene monomer are added during a period of two hours, and the temperature being controlled in the range of from about 41.8 to 43.1 degrees C. Following addition of the butadiene, the reaction mixture is stirred for approximately two hours, during which time the temperature is adjusted to 42° C. At the end of the latter period, the mixture is discharged with stirring into a liter of methyl alcohol thereby precipitating the polymer as the lower layer of a two-phase liquid system.

Following the production of the polybutadiene as a separate liquid phase, the polymer is separated, re-dissolved in benzene, precipitated in methanol and washed with hot methanol. The polymer is subsequently dried at a pressure of 2 millimeters mercury absolute and 60° C. for three hours to yield 64.5 grams of polymer.

Polybutadiene prepared as above, having a molecular weight of 3,850 and containing about 42.4% (of the monomeric units) cis-1,4; 49.2% trans-1,4, and 8.4% of the 1,2 structure, i.e., amounting to about 6 vinyl groups per molecule, is employed to produce an ethylene/propylene/polybutadiene interpolymer as follows.

To a clean, dry, 12-ounce polymerization bottle are added 200 milliliters of hexane, after which the bottle is flushed with nitrogen and capped with a puncturable, self-sealing cap. Following introduction of the hexane, 4.00 milliliters of polybutadiene are added through the cap by means of a hypodermic syringe, and propylene is fed to the bottle until a pressure of 9.5 p.s.i.g. is obtained. Next are added 4.07 milliliters of a solution containing 5 milliliters of 100% ethylaluminum sesquichloride in 50 milliliters of normal hexane, also by means of a syringe, and the bottle is brought to, and maintained at a pressure of 10.5 p.s.i.g. with a 50/50 (by volume) mixture of ethylene and propylene. To initiate the polymerization, 5.0 milliliters of a solution containing 1 milliliter of 100% $VOCl_3$ in 50 milliliters of normal hexane are added with the hypodermic syringe to the mixture in the bottle.

The polymerization thus begun is continued for a period of about 1 hour, the bottle being maintained during such time at about room temperature. At the end of the hour, the bottle is vented and the reaction terminated by discharging the contents into approximately 1 liter of methanol, a procedure which results in the precipitation of 13.2 grams of the interpolymer product as a white crumb. The polymer is gel-free and soluble in hydrocarbons.

Subsequent examination of the interpolymer shows it to contain approximately equal mole amounts, of ethylene and propylene monomeric units and to have a Kemp-Mueller Iodine Number of 58, a value which is calculated to be equivalent to a polybutadiene content of 0.14 mole percent.

To determine the vulcanization potential of the interpolymer, a 5 gram aliquot portion of the product is milled with 2.0 grams of various compounding materials to give a compound having the following composition.

| Material: | Parts by wt. |
|---|---|
| Synthesized interpolymer | 100 |
| Ethylene/propylene copolymer-Enjay Chemical Company's "EPR 404" | 21.0 |
| Zinc oxide | 10.0 |
| Stearic acid | 2.0 |
| 2-mercaptobenzothiazole | 1.0 |
| Tetramethyl thiuram monosulfide | 3.0 |
| Sulfur | 3.0 |

Following milling, the compound is sheeted out, and ¼ inch discs are cut therefrom.

Vulcanization characteristics of the compound are tested by placing the discs about the probe of a Shawbury Curometer. The Curometer, a device commonly employed to test curing capabilities, provides an indication of the degree of vulcanization by monitoring the dynamic modulus of the sample during a constant temperature, 320° F., heating period sufficient to produce vulcanization. During the test period, the modulus is constantly tested by motion of the probe back and forth through the sample, heat is simultaneously supplied to the specimen, and the length of probe travel is continuously measured. The dynamic modulus of samples amenable to sulfur vulcanization changes as curing progresses, such fact being indicated by two lines drawn on a moving chart which respond to variations in travel of the probe. In those cases in which a cure is obtained, the lines gradually converge; whereas in samples incapable of undergoing a sulfur cure, the trace lines remain substantially parallel. In the herein detailed test, a tell-tale convergence of lines is obtained within about three minutes, indicating that the interpolymer is capable of undergoing satisfactory sulfur vulcanization.

*Example 2.*—This example illustrates the relative inactivity of a polybutadiene having less than 2 vinyls per polymer molecule when employed in interpolymerization with ethylene and propylene.

Employing substantially the same procedure described in Example 1, a liquid polybutadiene is prepared exhibiting a molecular weight of 740. Infrared analysis indicates the following microstructure: 38.7% cis-1,4; 48.5% trans-1,4; 12.8% 1,2. Accordingly, the number of vinyls per polybutadiene molecule is equal to $(12.8/100)(740/54) = 1.8$.

To a 12-ounce polymerization bottle previously cleaned and dried is added 200 milliliters of hexane, after which the bottle is flushed with nitrogen and closed with a puncturable self-sealing cap. To the sealed bottle is next added 4 grams of a solution containing 20 grams of the above polybutadiene in 20 grams of hexane, the addition being made with a hypodermic needle. The bottle is then pressured to 9.5 p.s.i.g. with propylene, and 4.07 milliliters of an aluminum sesquichloride solution containing 5.0 milliliters of the $Et_3Al_2Cl_3$ in 50 milliliters of hexane are also added. The reaction mixture is subsequently pressured to 10.5 p.s.i.g. with a 50/50 (by volume) mixture of ethylene and propylene, following which 5.0 milliliters of a solution containing 1.0 milliliter of $VOCl_3$ in 50 milliliters of hexane are introduced.

Upon addition of the vanadium compound, the reaction is initiated and permitted to continue for 1.5 hours until reaction of the monomeric constituents is substantially complete. The ethylene and propylene monomeric units in the interpolymer are found to be present on about an equimolar basis.

In seven experiments employing substantially the same procedure and the liquid polybutadiene containing 1.8 vinyls per molecule, it is found that only from about 16 to 32 mole percent of the polybutadiene charged entered into the interpolymer. Polybutadiene containing less than 2 vinyls per molecule is not a sufficiently active species to partake in the polymerization to any appreciable extent as shown by less than about ⅓ of the polybutadiene charged entering into the polymerization.

*Example 3.*—Employing substantially the same procedure described in Example 1, a liquid polybutadiene is prepared exhibiting a molecular weight of 3200. Infrared analysis indicates the following microstructure: 42.4% cis-1,4, 49.2% trans-1,4, 8.4% 1,2. Accordingly, the number of vinyls per polybutadiene molecule is equal to $(8.4/100)(3200/54) = 5$.

To a 12-ounce polymerization bottle previously cleaned and dried is added 200 milliliters of hexane, after which the bottle is flushed with nitrogen and closed with a puncturable self-sealing cap. To the sealed bottle is next added 4 grams of a solution containing 20 grams of the above polybutadiene in 20 grams of hexane, the addition being made with a hypodermic needle. The bottle is then pressured to 9.5 p.s.i.g. with propylene, and 4.07 milliliters of an aluminum sesquichloride solution containing 5.0 milliliters of the $Et_3Al_2Cl_3$ in 50 milliliters of hexane are also added. The reaction mixture is subsequently pressured to 10.5 p.s.i.g. with a 50/50 (by volume) mixture of ethylene and propylene, following which 5.0 milliliters of a solution containing 1.0 milliliter of $VOCl_3$ in 50 milliliters of hexane are introduced.

Upon addition of the vanadium compound, the reaction is initiated and permitted to continue until reaction of the monomeric constituents is substantially complete. The ethylene and propylene monomeric units in the interpolymer are found to be present on about an equimolar basis.

In eight experiments employing substantially the same procedure and the liquid polybutadiene containing 5 vinyls per molecule, it is found that in each instance from about 70 to 100 mole percent of the polybutadiene charged entered the interpolymer. In addition, there is found essentially no gel, i.e., less than 1%, in the interpolymer in xylene at 100° C. indicating that no crosslinking and a completely soluble polymer is obtained.

*Example 4.*—This example illustrates the obtainment of a highly gelled interpolymer through use of a polybutadiene containing greater than 8 vinyls per molecule. In addition, it can be seen that at higher levels of vinyls per molecule there is a reduction in the amount of polybutadiene which enters the interpolymer. Although not wishing to be bound by any theory or mechanism, it is currently believed that this reduction in activity is attributable to the free vinyl groups complexing with the catalyst.

A quart polymerization bottle previously cleaned and dried is charged with 229 grams of dry benzene, 156 grams of butene-1, 70 grams of butadiene, 0.03 milliliters of water, 3.7 milliliters of diethylaluminum iodide solution (1.52 molar in benzene), and 1.0 milliliters of cobalt octoate solution (0.0435) millimoles per milliliter in benzene. The bottle was capped, placed in a water bath and tumbled therein at room temperature. An hour after the polymerization began, another 0.5 milliliters of cobalt octoate solution was charged. The polymerization was continued for about 17 hours to 95% conversion of butadiene. Thereafter, the bottle was opened and the cement washed with tap water and recovered.

The liquid polybutadiene thus obtained exhibited a DSV of 0.13 and a molecular weight of 2600. Infrared analysis indicated the following microstructure: 61.5% cis-1,4, 13.0% trans-1,4, 25.5% 1,2. Accordingly, the number of vinyl groups per molecule is equal to (25.5/100) (2600/54)=12.3.

In eight experiments employing substantially the same procedure and the polybutadiene containing 11.8 vinyls per molecule, it is found that in each instance only from about 20 to about 40 percent of the polybutadiene charged entered the terpolymer. Also, the resulting terpolymer contained from about 15 to about 30 percent gel in toluene at 100° C. indicating substantial crosslinking and insolubility.

*Example 5.*—A liquid copolymer of butadiene and isoprene capable of interpolymerizing with ethylene and propylene is prepared in the following manner. An apparatus is assembled consisting of a three necked flask fitted with a Dry Ice condenser and an air stirrer. To the flask, which is maintained under a nitrogen atmosphere, are added 1 liter of tetrahydrofuran (previously purified by distillation from sodium under nitrogen), 50.1 grams of sodium dispersed in mineral oil (2.16 equivalents), and 46 grams (0.2 mole) of p-terphenyl. A blue color forms at once. The flask is then cooled to −25° and 135 grams (1.985 moles) of isoprene (polymerization grade) are added drop-wise over a three-hour period. The mixture is subsequently cooled at −40° C., and 61 grams (1.13 moles) of butadiene are immediately added. In spite of cooling the flask with a Dry Ice/acetone mixture, the temperature rises to −25° C. After 30 minutes, the reaction is terminated by the addition of 10 milliliters of ethanol, and the contents are allowed to stand overnight. The next day 100 milliliters of dilute HCl are stirred in, and the contents of the flask transferred to a separatory funnel. The water is removed, and the organic layer is washed four times with 100 milliliters of distilled water. Benzene (1 liter) is added to the organic layer, and the mixture is distilled to remove water azeotropically. The liquid produced is dried on a Rinco evaporator at 30 mm. Hg and 60° C. and the resulting clear liquid product distilled on a Nestor 20 plate spinning band still. A clear, very pale yellow fraction boiling at 81° C. to 122° C. at 16 mm. Hg and exhibiting a molecular weight of about 285 is chosen for polymerization tests. This isoprene/butadiene copolymer, which by infrared spectra shows internal unsaturation as well as vinyl and isoprenyl groups, is used to produce an interpolymer with ethylene and propylene as follows.

To a clean dry 12-ounce polymerization bottle are added 200 milliliters of hexane, after which the bottle is flushed with nitrogen and capped with a puncture-seal cap. Afterwards, 4.0 milliliters of the isoprene/butadiene copolymer are added through the cap by means of a hypodermic syringe. The bottle is subsequently pressured to 9.5 p.s.i.g. with propylene, and 4.0 milliliters of the $Et_3Al_2Cl_3$ solution of Example 2 are added with a syringe following which the bottle is brought to, and maintained at 10.5 p.s.i.g. with a 50/50 (volume) mixture of ethylene and propylene. To initiate the polymerization 5.0 ml. of the $VOCl_3$ solution of Example 2 are added. After being shaken for about 1 hour at room temperature, the bottle is vented and the contents poured into 1 liter of ethanol, a procedure which terminates the polymerization and precipitates 8.6 grams of polymer in the form of a white crumb. The polymer is then washed with methanol, dried 16 hours at 2 mm. Hg and 50° C., and analyzed. The product polymer is found to contain approximately equal molar amounts of ethylene and propylene, to have a Kemp-Mueller Iodine Number of 12.7 and to be essentially gel-free and soluble in hydrocarbons. The interpolymer is milled with the compounding ingredients described in Example 1, sheeted out, and discs cut for the Shawbury curometer test. The curometer test shows a convergence of lines in about 8 minutes, indicating that a satisfactory sulfur vulcanization has occurred.

*Example 6.*—A liquid copolymer of butadiene and styrene is prepared by conventional free-radical polymerization techniques in t-butyl alcohol with an azobisisobuteronitrile initiator. The copolymer is found to contain about 17 weight percent styrene, and to have an isopiestic molecular weight of about 1450. The butadiene moiety of the copolymer consists of about 21 percent 1,2-placements, 70 percent trans-1,4-placements and 9 percent cis-1,4 placements. This copolymer is used to make a terpolymer with ethylene and propylene as follows.

To a glass, 12-ounce polymerization bottle are added 200 milliliters of hexane and 3.8 grams of the liquid butadiene/styrene copolymer under a nitrogen flush. The bottle is capped with a puncturable self-sealing cap and pressured to 9.5 p.s.i.g. with propylene. Thereupon 2.5 milliliters of the ethyl aluminum sesquihalide solution of Example 2 are injected with a hypodermic syringe and the bottle is pressured to 10.5 p.s.i.g. with an equimolar mixture of ethylene and propylene. The polymerization, which is initiated with 5.00 milliliters of the $VOCl_3$ solution of Example 2, is allowed to continue for about 2 hours, at which time the bottle is vented and the contents poured into 1 liter of stirred ethanol. This procedure results in the formation of 16.1 grams of polymer crumb. The Iodine Number of the interpolymer is found by analysis to be about 43.7 and the amounts of ethylene and propylene to be about equal. The terpolymer is essentially gel-free and soluble in hydrocarbons.

The sulfur vulcanization characteristics of the terpolymer are examined as usual by milling 5.00 grams of the interpolymer with the compounding ingredients mentioned previously in Example 1. The compound is sheeted out, and curometer samples are cut, placed in the curometer and vulcanized. After almost four minutes, the convergence of lines obtained indicates that a satisfactory cure can be obtained with the sulfur vulcanizing agents.

What is claimed is:

1. A substantially gel-free, hydrocarbon soluble, sulfur vulcanizable, elastomeric interpolymer prepared by polymerizing a mixture of at least two mono-olefins containing 2 to about 8 carbon atoms in the presence of a polymer of a conjugated diolefin containing from about 4 to about 8 carbon atoms exhibiting a molecular weight less than about 5,000 and containing from 2 to about 8 vinyl groups per molecule using a catalyst system comprising an organometallic compound of a metal in Groups II–A through IV–A of the Periodic Table in combination with a compound of a heavy metal situated in Groups IV–B through VII–B and VIII of the Periodic Table, said diolefin polymer comprising from about 0.1 to about 1.5 mole percent of the interpolymer.

2. The vulcanized product of claim 1.

3. A substantially gel-free, hydrocarbon soluble, sulfur vulcanizable, elastomeric interpolymer prepared by polymerizing a mixture of at least two mono-olefins containing 2 to about 8 carbon atoms in the presence of a butadiene polymer exhibiting a molecular weight less than about 5,000 and containing from 2 to about 8 vinyl groups per molecule using a catalyst system comprising an organoaluminum compound in combination with a compound of a heavy metal situated in Groups IV–B through VII–B and VIII of the Periodic Table, said butadiene polymer comprising from about 0.1 to about 1.5 mole percent of the interpolymer.

4. The vulcanized product of claim 3.

5. An interpolymer as defined in claim 3 wherein the mono-olefins are ethylene and propylene.

6. An interpolymer as defined in claim 3 wherein the heavy metal compound is a compound of vanadium.

7. An interpolymer as defined in claim 3 wherein the heavy metal compound is a compound of titanium.

8. A substantially gel-free, hydrocarbon soluble, sulfur vulcanizable, elastomeric interpolymer prepared by polymerizing a mixture of at least two mono-olefins containing 2 to about 8 carbon atoms in the presence of an isoprene polymer exhibiting a molecular weight less than about 5,000 and containing from 2 to about 8 vinyl groups per molecule using a catalyst system comprising an organoaluminum compound in combination with a compound of a heavy metal situated in Groups IV-B through VII-B and VIII of the Periodic Table, said isoprene polymer comprising from about 0.1 to about 1.5 mole percent of the interpolymer.

9. The vulcanized product of claim 8.

10. An interpolymer as defined in claim 8 wherein the mono-olefins are ethylene and propylene.

11. An interpolymer as defined in claim 8 wherein the heavy metal compound is a compound of vanadium.

12. An interpolymer as defined in claim 8 wherein the heavy metal compound is a compound of titanium.

References Cited

UNITED STATES PATENTS

| | | | |
|---|---|---|---|
| 2,962,472 | 11/1960 | Stuart | 260—878 X |
| 3,280,082 | 10/1966 | Natta et al. | 260—80.7 |
| 3,317,918 | 5/1967 | Foster | 260—83.7 |

FOREIGN PATENTS

| | | |
|---|---|---|
| 654,607 | 12/1962 | Canada. |
| 962,250 | 7/1964 | Great Britain. |
| 1,151,941 | 2/1964 | Germany. |

MURRAY TILLMAN, Primary Examiner

M. J. TULLY, Assistant Examiner

U.S. Cl. X.R.

260—5, 79.5, 876, 879, 889